INVENTOR
E. W. LARSEN
BY Harry C. Duft
ATTORNEY

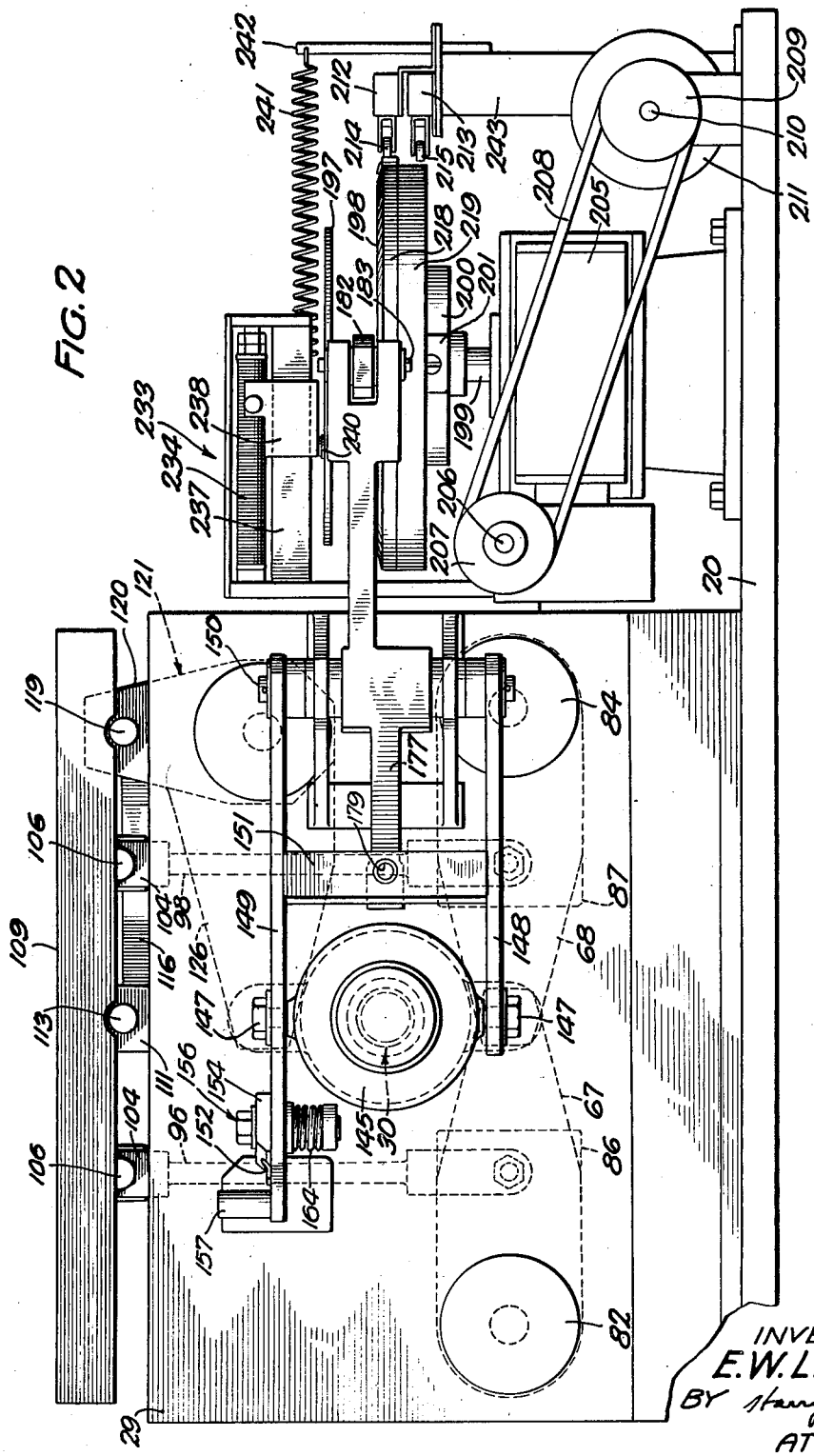

March 30, 1948.  E. W. LARSEN  2,438,755
VIBRATING APPARATUS
Filed Feb. 15, 1944  8 Sheets-Sheet 3
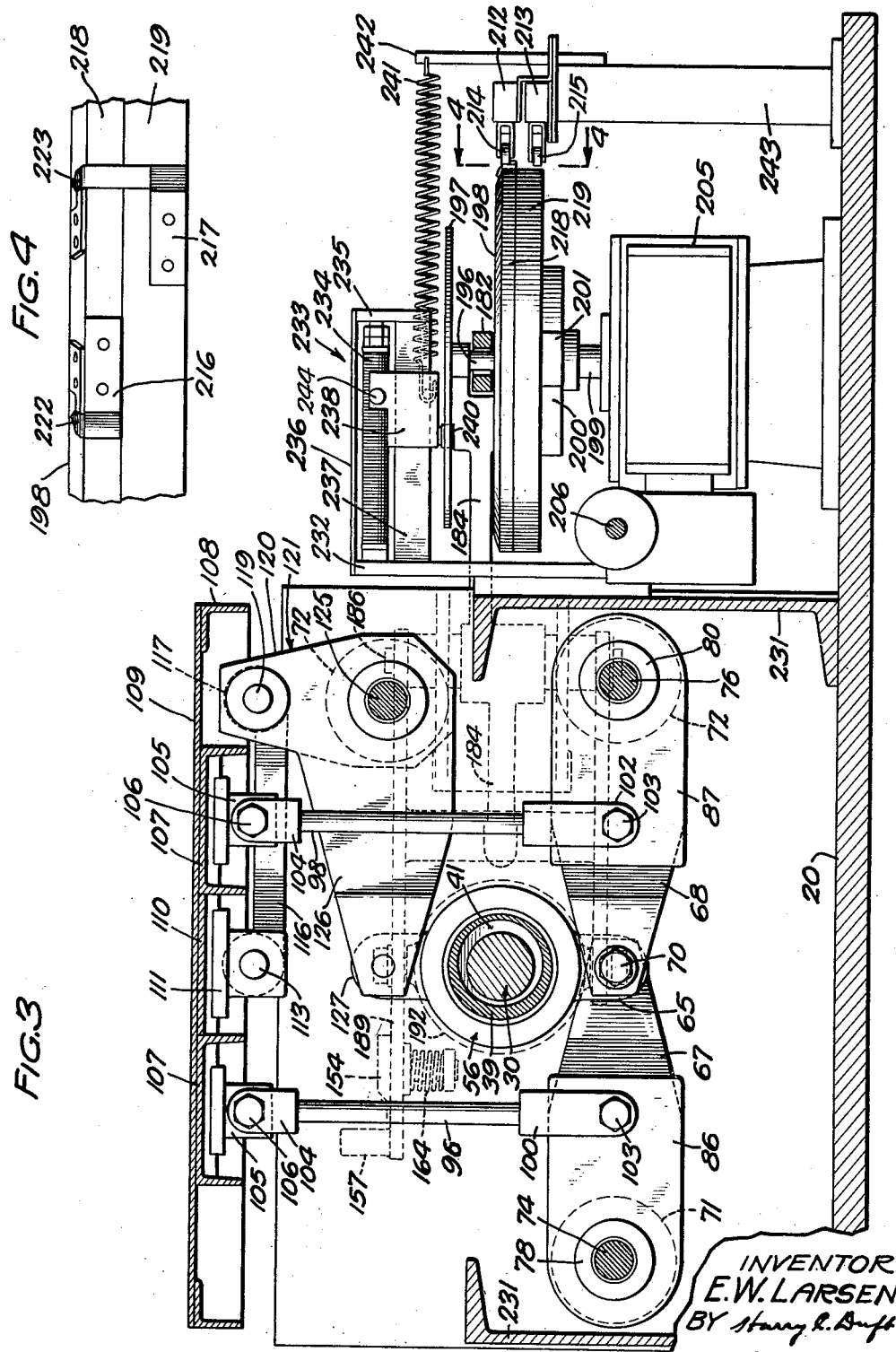
INVENTOR
E.W. LARSEN
BY Harry R. Duft
ATTORNEY

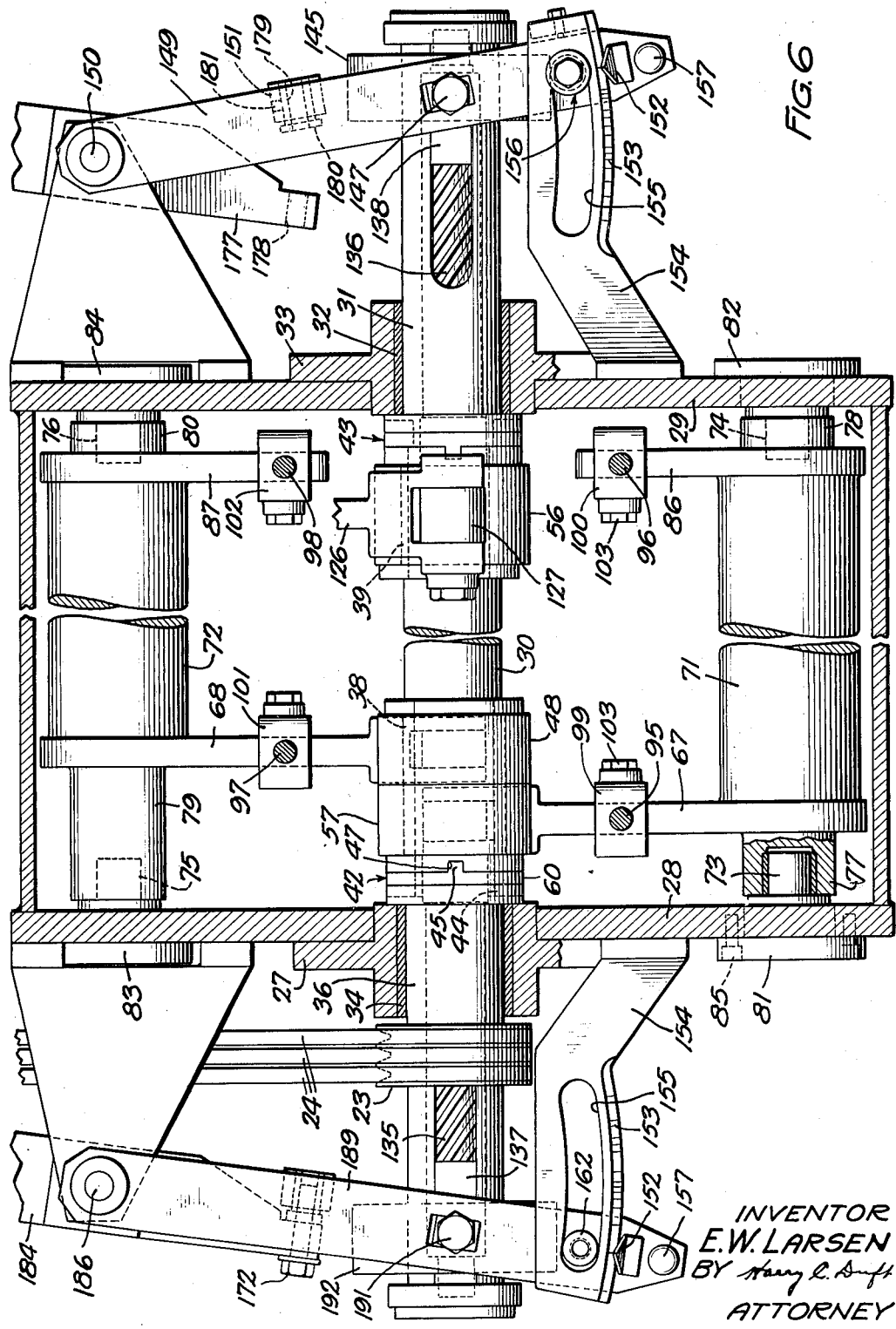

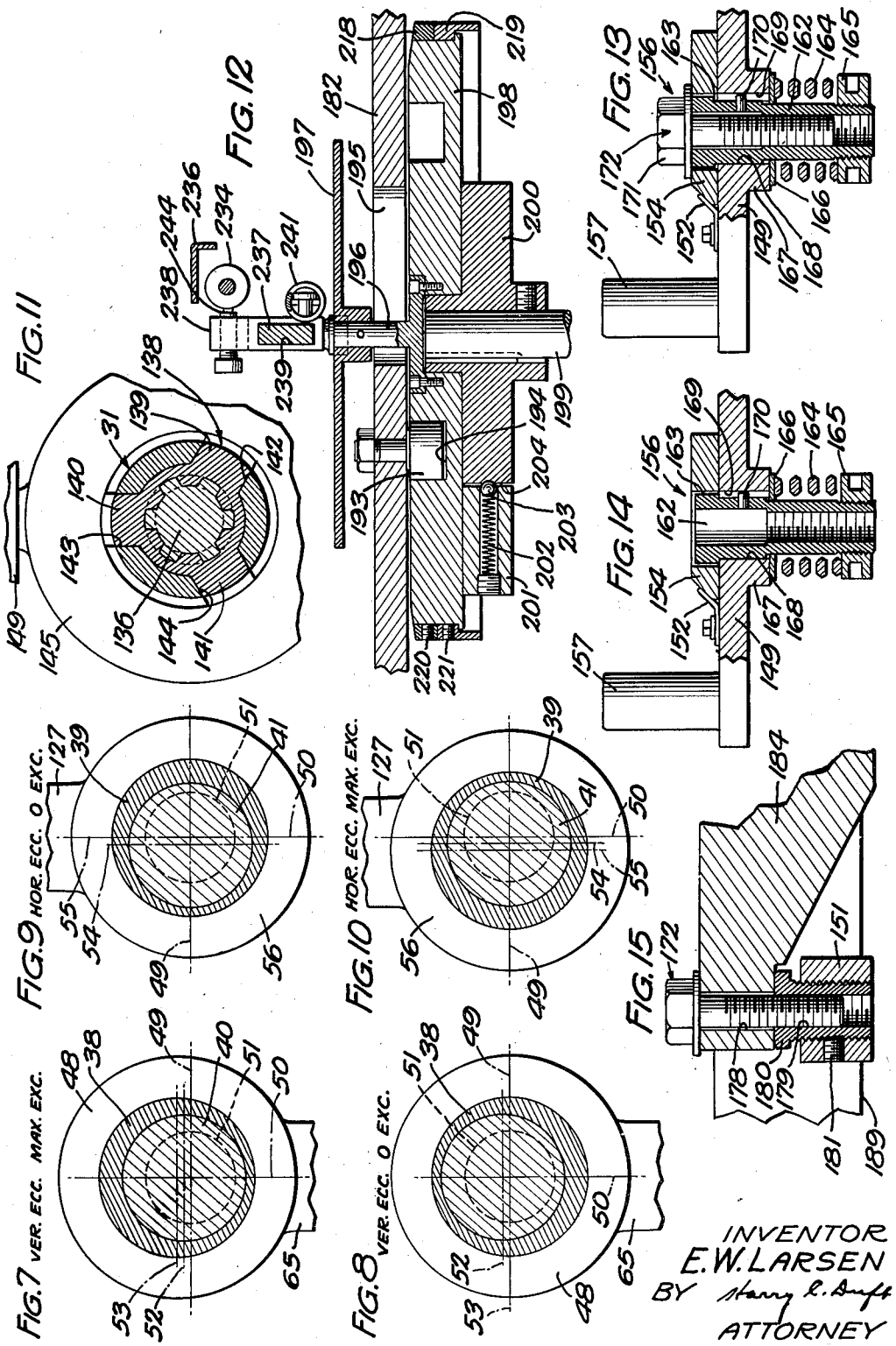

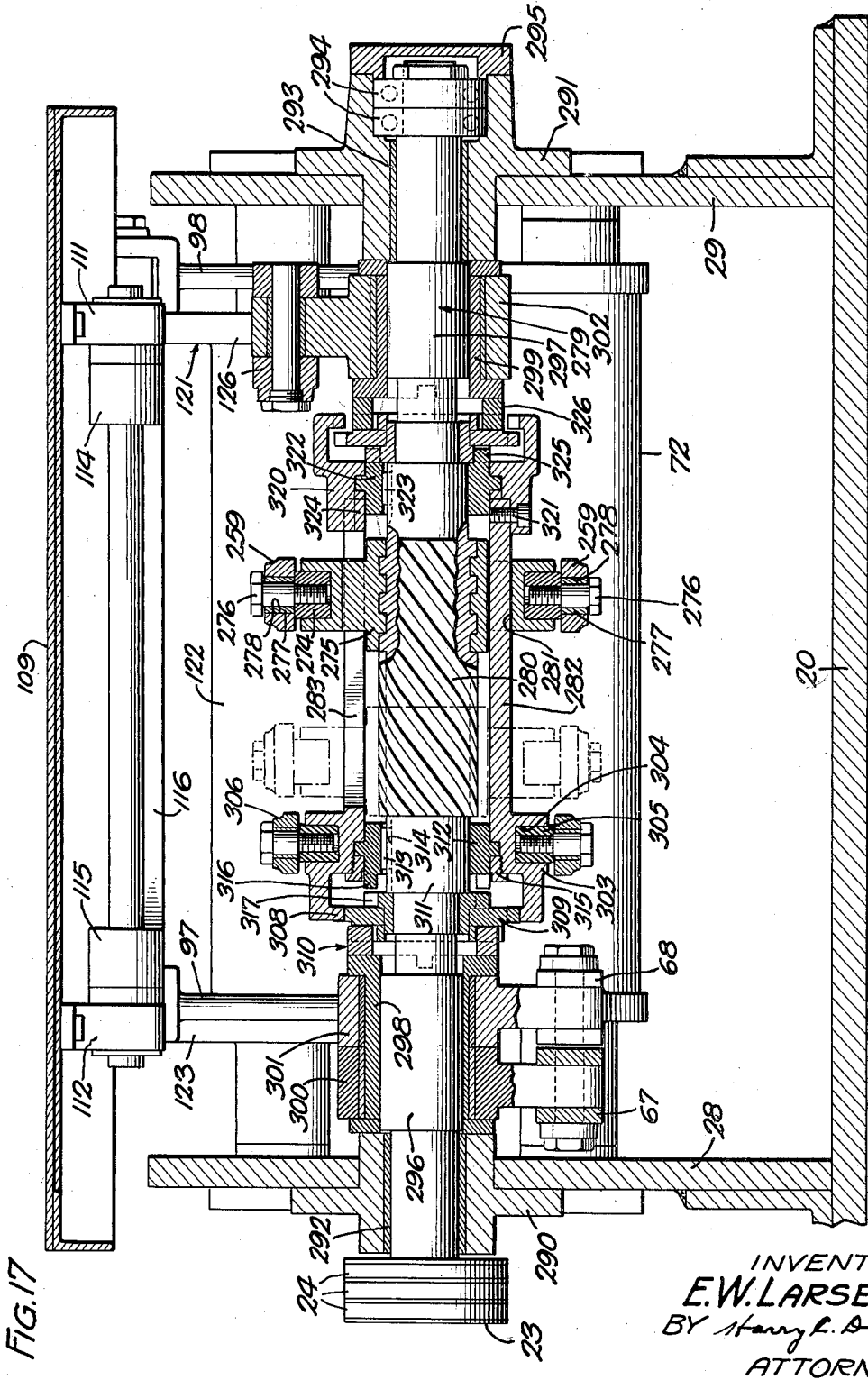

Patented Mar. 30, 1948

2,438,755

UNITED STATES PATENT OFFICE 2,438,755

VIBRATING APPARATUS

Einer W. Larsen, Elmhurst, Ill., assignor to Western Electric Company, Incorporated, New York, N. Y., a corporation of New York Application February 15, 1944, Serial No. 522,524

28 Claims. (Cl. 73—67)

1

This invention relates to vibrating apparatus and more particularly to a vibrating machine for simulating the vibrations to which apparatus will be subjected when in service.

In the manufacture of electrical apparatus for use in war planes and war ships, etc., the apparatus must be constructed to operate under all conditions to which it may be subjected in service and, accordingly, it is necessary to test the apparatus while subjecting it to such vibrations and shocks as it may receive in use. There have been various mechanisms built which attempted to simulate the operating conditions to which such electrical apparatus would be subjected, but as far as is known, none of these mechanisms was capable of automatically subjecting the apparatus to vibrations vertically and horizontally wherein the excursion of vibration and speed of vibration are varied over an appreciable range while being maintained proportional one to the other to maintain a constant peak of acceleration.

It is an object of the present invention to provide a simple apparatus for vibrating articles in simulation of conditions to which the articles may be subjected in service.

In accordance with one embodiment of the invention, a reversible constant speed motor drives a pair of cams alternately in opposite directions to shift a main control bar and a potentiometer brush back and forth in a fixed path and through a predetermined distance. The potentiometer brush controls the speed of a main drive motor and the main control bar may or may not be connected to actuate either of two arms each operating to adjust the relative eccentricity of an eccentric bushing with respect to an eccentric portion of a shaft driven by the main drive motor. One of the arms and the bushings associated with it control the horizontal excursion of a support table while the other arm and bushing control its vertical excursion. Mechanism is provided for controlling the control motor's cycle, thereby to adjust the range of speed and excursion of the apparatus. The eccentric control arms are so constructed that they may be disengaged from the main control bar so that the machine speed may be cycled between low and high speeds at a fixed excursion. In this case, however, in order to avoid too high an excursion for a given speed, provision is made for automatically shifting the excursion control arms to maintain a limiting and definite acceleration in the table.

In an alternate embodiment of the invention, a single excursion control arm is provided for varying the excursion of a table, and alternately effective clutch mechanisms are provided to connect the table to the eccentrics for horizontal or vertical vibration.

A complete understanding of the invention may be had by reference to the following detailed description of two embodiments thereof when considered in conjunction with the accompanying drawings, wherein Fig. 1 is a plan view, partly broken away, of that embodiment of the invention which utilizes two separate bushings for imparting the horizontal and vertical vibrations to the table;

Fig. 2 is a side elevational view of the apparatus shown in Fig. 1, looking at the side of the apparatus as indicated by the line 2—2 of Fig. 1;

Fig. 3 is a longitudinal vertical sectional view taken substantially along the line 3—3 of Fig. 1 in the direction of the arrows;

Fig. 4 is an end elevational view of a part of the control means for the constant speed motor looking in the direction indicated by the arrows along line 4—4 of Fig. 3;

Fig. 6 is a plan section taken substantially along the line 6—6 of Fig. 5 in the direction of the arrows and showing the means for connecting the arms to actuate the separate eccentric bushings for imparting vertical and horizontal vibration to the support table;

Figure 1:
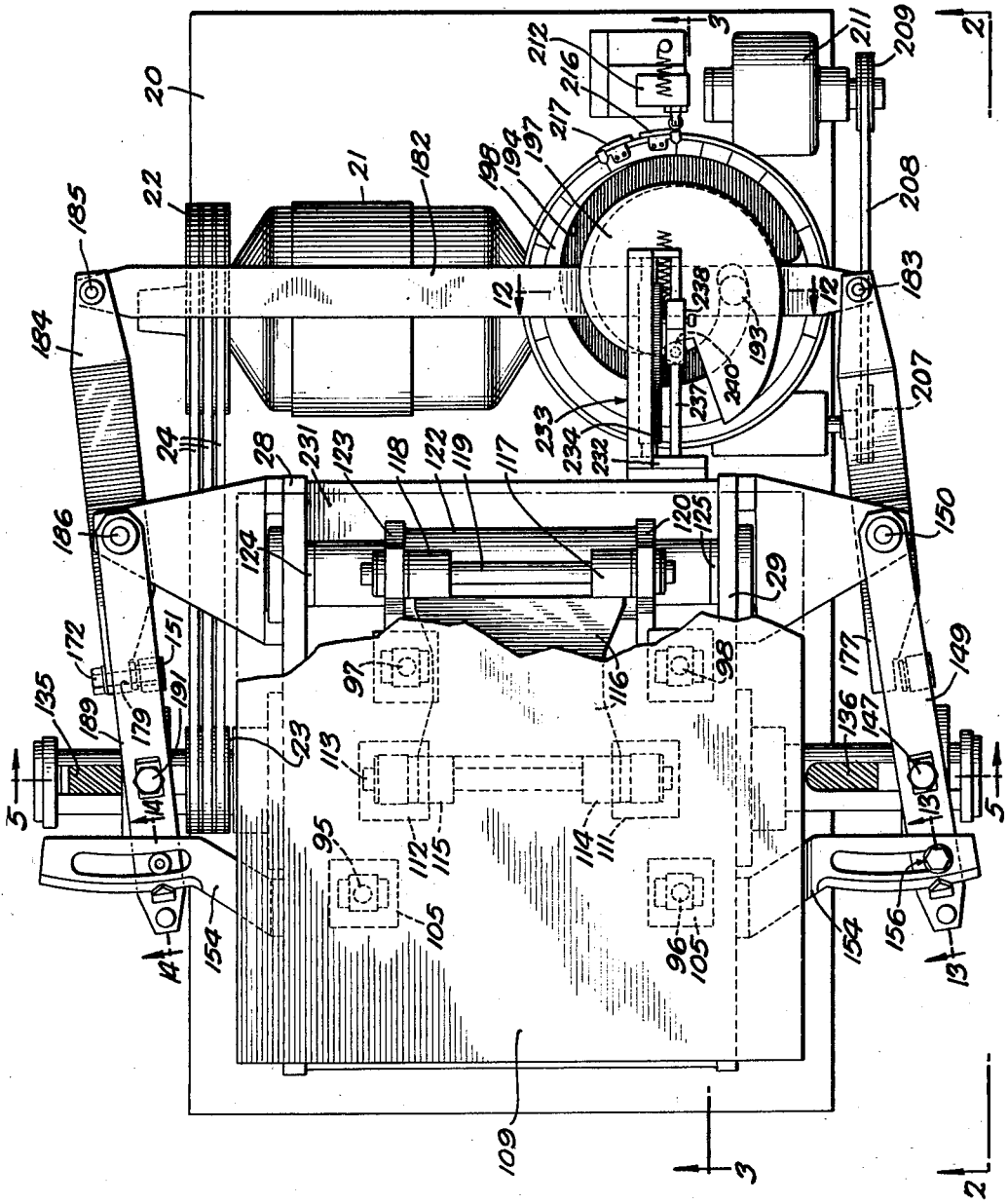
Figure 5:
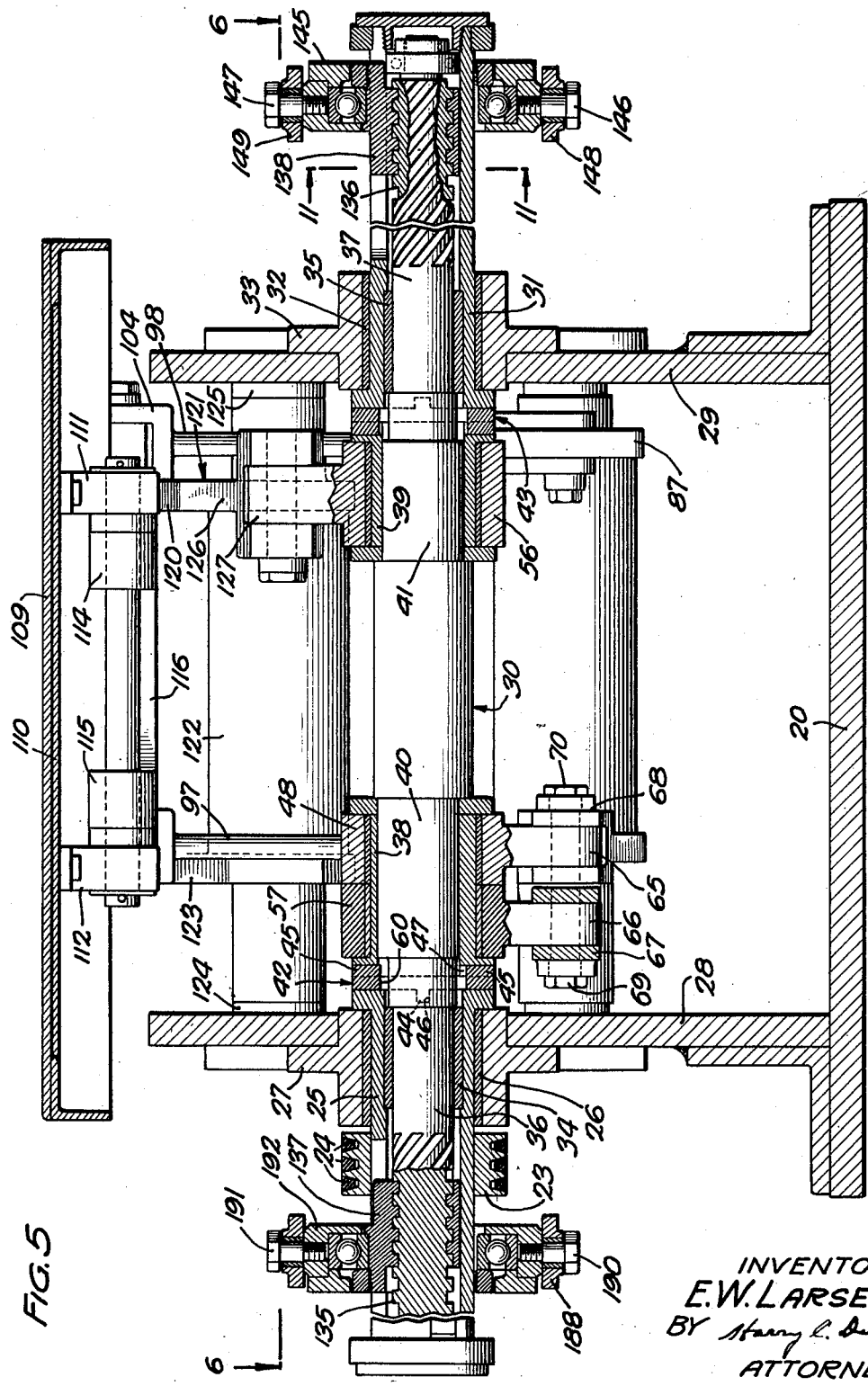
Fig. 5 is a transverse vertical sectional view taken substantially along the line 5—5 of Fig. 1 in the direction of the arrows showing details of construction of the eccentrics and the means for operating the eccentrics.
Figure 16:
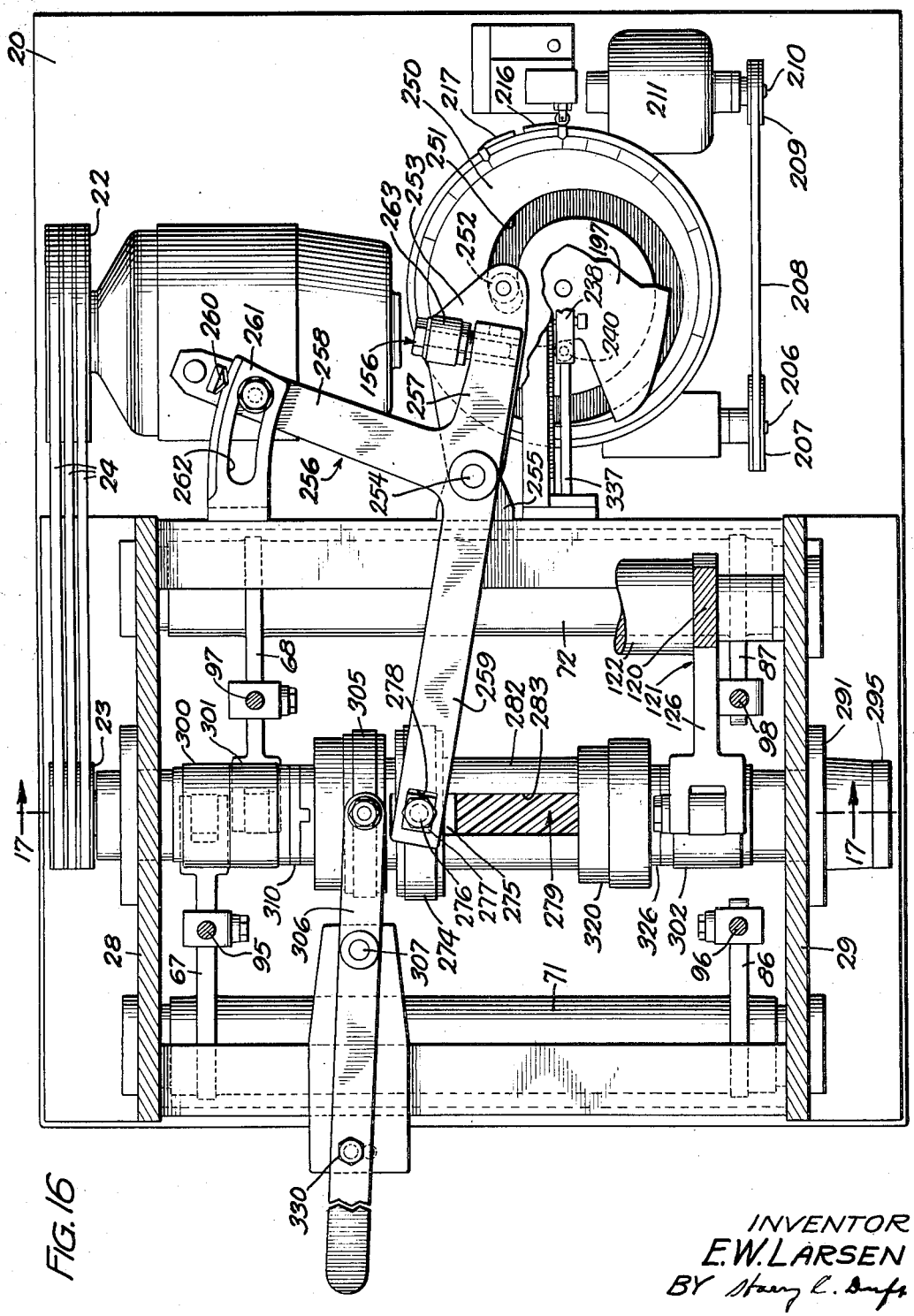

Figs. 7, 8, 9 and 10 are fragmentary detail sectional views taken through the eccentric portions of the shaft and through the eccentric bushings, Fig. 7 showing the eccentric portion of the shaft and bushing in the position where they will drive the support table through its maximum excursion, Fig. 8 showing the shaft and bushing so positioned that they will impart no vertical vibrations to the support table, Fig. 9 showing the eccentrics which drive the table horizontally in the position where they will not vibrate the support table, and Fig. 10 showing the bushing and shaft in the position of eccentricity where they will impart the maximum excursion to the table horizontally;

Fig. 11 is a fragmentary sectional view taken substantially along the line 11—11 of Fig. 5 and showing part of the mechanism for rotating the bushing with respect to the shaft to vary the eccentricity;

Fig. 12 is a fragmentary transverse sectional view taken substantially along the line 12—12 of Fig. 1 in the direction of the arrows;

Fig. 13 is an enlarged fragmentary detail sectional view, partly in elevation, taken substantially along the line 13—13 of Fig. 1;

Fig. 14 is an enlarged detail sectional view taken substantially along the line 14—14 of Fig. 1 in the direction of the arrows;

Fig. 15 is a fragmentary plan sectional view through one of the connections between the main control bar and one of the operating arms, as shown on the left side of Fig. 6;

Fig. 16 is a plan sectional view taken through a machine made in accordance with the second-mentioned embodiment of the invention, wherein two adjustable bushings are provided, as in the first embodiment, but actuated by a single cam arm and wherein clutches are provided for shifting the control from one eccentric bushing to the other; and Fig. 17 is a transverse vertical sectional view taken substantially along the line 17—17 of Fig. 16 in the direction of the arrows.

In the specific embodiment of the invention chosen for illustration, apparatus is shown in the embodiment illustrated in Figs. 1 to 15 for vibrating a support table through a cycle of from 60 to 30 vibrations per second while passing through a range or excursion of from .054" to .217". In other words, the support table is to be vibrated at such a rate that its acceleration will be maintained at ten times the acceleration of gravity over the range of excursions from .054" to .217", where the excursion constitutes the distance of movement of the table from one extreme to the other. In providing mechanism for accomplishing this effect, the mechanism includes a main base member 20 having a main drive motor 21 mounted upon it and equipped with a belt-driving pulley 22, which drives a driven pulley 23 through a series of belts 24. The pulley 23, as shown most clearly in Fig. 5, is attached to a bushing 25 rotatable within a bearing 26, which is, in turn, mounted within a bearing block 27. The bearing block 27 is mounted in a side frame member 28 suitably attached to the main base member 20. The side frame member 28 cooperates with a second frame member 29, also mounted on the base 20, to support a shaft 30, which is rotatable with respect to the bushing 25 and a cooperating bushing 31. The bushing 31 is surrounded by a bearing 32 seated in a bearing block 33 of the same construction as the bearing block 27 and a pair of bearing members 34 and 35 are interposed between reduced portions 36 and 37 of the shaft 30 and bushings 25 and 31, respectively. The two reduced portions 36 and 37 of the shaft 30 are concentric with the bushings 25 and 31 and, consequently, the bushings 25 and 31 may be rotated relative to the shaft 30 to adjust the eccentricity of eccentric bushings 38 and 39 with respect to eccentric portions 40 and 41 of the shaft 30 through the operation of "Oldham" type couplings 42 and 43, respectively. The Oldham couplings 42 and 43 are of exactly the same construction and only one of them will be described herein.

This coupling 42 comprises an annular member 60 having keys 44 and 45 extending at right angles one to another and projecting into keyways 46 and 47 formed in the bushing 25 and the bushing 38, respectively, whereby the couplings will serve to interconnect the bushing 25 and the bushing 38 for rotation together, but will permit the bushing 38 to be moved eccentrically of the axis of the shaft 30. The arrangement of the eccentric portions 40 and 41 with respect to the eccentric bushings 38 and 39 are clearly illustrated in Figs. 7, 8, 9 and 10, wherein Fig. 7 shows the eccentric portion 40 and eccentric bushing 38 turned relative one to another to the maximum point of their eccentricity, where a bearing ring 48 for reciprocating or vibrating the table vertically will be driven through its maximum excursion. In Figs. 7, 8, 9 and 10, the horizontal centerline of the shaft 30 is indicated by the line 49 and the vertical centerline of the shaft is indicated by the line 50. In these figures, the dotted line 51 shows the outer surface of the reduced portion 36 or the reduced portion 37 of the shaft 30 more clearly to illustrate the eccentricity of bushings 38 and 39 and portions 40 and 41 of the shaft. In Figs. 7 and 8, the dot and dash line 52 indicates the horizontal center of the eccentric portion 40 and the dot and dash line 53 indicates the horizontal centerline of the eccentric bushing 38. It will be noted in Fig. 8 that lines 49 and 53 coincide so that no reciprocation will be imparted to the bearing 48. Similarly, in Figs. 9 and 10, the dot and dash lines 54 and 55 indicate the vertical centerlines of the eccentric portion 41 of the shaft 30 and eccentric bushing 39, respectively. As shown in Fig. 10, the bushing and shaft have been turned relative one to another to impart the maximum amount of movement to a bearing 56. When the bushing 39 and eccentric portion 41 are rotated relative one to another to impart no movement to the bearing 56, the line 55, as indicated in Fig. 9, will coincide with the line 50. While only one bearing ring 48 has been described in detail in connection with mechanism for imparting vertical vibrations to an article being tested, there is a pair of these bearing rings encircling the bushing 38, the one bearing ring designated 48 and a similar bearing ring designated 57, the purpose of which will become apparent as the description progresses.

Formed integrally with the bearing ring 48 is an actuator arm 65 and formed integrally with the bearing 57 is an actuator arm 66 (Fig. 5). These arms extend downwardly and are pivoted to the ends of rock levers 68 and 67, respectively, which are bifurcated at their ends to receive the actuator arms 65 and 66 and to which the arms are pinned by means of pivot pins 70 and 69, respectively. As shown most clearly in Figs. 3 and 6, the rock levers 67 and 68 are welded to or otherwise suitably attached to shafts 71 and 72, which are, in turn, rotatably mounted on trunnions 73 and 74 and 75 and 76, which enter into the trunnion-receiving projections 77, 78, 79 and 80, respectively, extending outwardly from the shafts 71 and 72. The trunnions 73, 74, 75 and 76 are formed integrally with trunnion-supporting plates 81, 82, 83 and 84, suitably mounted in the side frame members 28 and 29, for example, by means of machine screws 85, as indicated in Fig. 6, holding the trunnion-supporting frame 81 on the side frame member 28. In addition to having the rock levers 67 and 68 welded or otherwise suitably attached to them, the shafts 71 and 72 have levers 86 and 87, respectively, fixed to them and lying in the same plane as the rock levers 67 and 68. A plurality of rods or links 95, 96, 97 and 98 are pivoted upon the rock lever 67, lever 86, rock lever 68, and lever 87, respectively, the lower ends of the rods extending into bifurcated connecting blocks 99, 100, 101 and 102, respectively, which are slotted to receive the levers 67, 68, 86 and 87. Each of the blocks 99, 100, 101 and 102 has a pivot pin 103 extending through its bifurcated portion and through the lever on which it is mounted to pivotally connect the rods or links to the various levers with which they are associated. At the upper ends of the rods or links 95, 96, 97 and 98, they are each provided with forked portions 104—104, adapted to receive pin blocks 105—105, which are attached to the forked portions 104—104 by pivot pins 106—106, as shown most clearly in Fig. 3. The pivot blocks 105 are, in turn, mounted on the webs of channel members 107—107 suitably attached to an article-supporting table framework 108.

From the foregoing, it is believed to be apparent that when reciprocation is imparted to the rods or links 95, 96, 97 and 98, the table framework 108 will be vibrated vertically to carry a table top 109 suitably secured to it in a vertical path through a distance determined by the relative eccentricity of the eccentric portion 40 of the shaft 30 and the bearings 48 and 57 and at a rate of speed determined by the speed of the shaft 30.

Adjacent to the center of the table and disposed between the channel members 107—107 is a plate 110 carrying a pair of pivot blocks 111 and 112 fixed to it and in which there is mounted a pivot shaft 113 which extends through bearing portions 114 and 115 of a link member 116. The link member 116 is provided at its right end (Fig. 1), with a pair of bearing blocks 117 and 118, in which a pin 119 is mounted. The pin 119 extends through an upwardly extending arm 120 of a bell crank 121, carried by a shaft 122. The shaft 122 also has a lever 123 fixed to it in alignment with the upwardly extending arm 120 of the bell crank 121 and the shaft is pivoted on trunnions 124 and 125 suitably mounted in the side frame members 28 and 29. The bell crank 121 has a horizontally extending arm 126 pivotally connected to an actuator arm 127 attached to the bearing ring 56. By means of this construction, the bell crank 121 will be rocked back and forth on trunnions 124 and 125 and through the link 116 will impart horizontal reciprocation to the article-supporting table framework 108, when the eccentric bushing 39 and eccentric portion 41 of the shaft 30 are so positioned with respect to each other as to hold the bearing ring 56 eccentric of the axis of shaft 30.

From the foregoing, it will be apparent that by imparting relative rotation to the eccentric bushings 38 or 39 with respect to their respective eccentric portions 40 or 41 of the shaft 30, either vertical or horizontal vibrations may be transmitted to the article-supporting table framework upon rotation of the shaft 30. The mechanism for controlling the degree of eccentricity of the bushings 38 and 39 with respect to the eccentric portions 40 and 41 of the shaft 30 will now be described.

As shown most clearly in Figs. 5 and 6, the outer ends of the shaft 30 have screw threads cut in them, as shown at 135 and 136, for threadedly engaging shiftable threaded members 137 and 138, respectively. The threaded members 137 and 138 are of exactly the same construction and, as shown in Fig. 11, the member 138 is provided with three splines 139, 140 and 141, which extend into slots 142, 143 and 144, respectively, formed in the bushing 31. Therefore, when the threaded member 138 is shifted to the right or left with respect to the shaft 30, relative rotation will be imparted to the bushing 31 and shaft 30, and through the "Oldham" coupling 43 to rotate the bushing 39 with respect to the eccentric portion 41 of the shaft 30. A ball bearing assembly 145 has its inner race attached to the threaded member 138 and its outer race pivotally connected by means of trunnions 146 and 147 to a pair of levers 148 and 149. The two levers 148 and 149 are pivoted on a common pivot pin 150 (Figs. 6 and 2) and are joined together adjacent their mid portion by a web 151. The lever 149 carries a pointer 152 at its left end, as viewed in Fig. 2, and at the right (Fig. 6). This pointer cooperates with a scale 153 marked on a bracket 154, which is, in turn, fixed to the side frame member 29. The bracket 154 is provided with an arcuate slot 155, through which part of a clamping assembly 156 may extend to clamp the lever 149 with respect to the bracket 154. A handle 157 mounted on the extreme end of the lever 149 may be utilized for moving the lever 149 to a selected position, as indicated by the cooperating pointer 152 and scale 153 and the clamping assembly 156 may then be set to tend to hold the lever 149 in the adjusted position.

The clamping assembly 156, as shown most clearly in Figs. 13 and 14, comprises a bushing 162 provided with a shoulder 163, which normally rests on the upper face of the lever 149. The shoulder 163 is urged to engage upper face of lever 149 by a compression spring 164 interposed between an adjustment nut 165 threaded on the lower end of the bushing 162 and a washer 166, which rests against an annular embossing 167 formed on the underside of the lever 149 and surrounding the aperture 168, in which the bushing 162 is positioned. One side of the aperture 168 has a keyway 169 formed in it for receiving a pin 170, which extends radially from the bushing 162 to prevent rotation of the bushing in the aperture 168. The effective force of the spring 164 may be varied by manipulating the adjustment nut 165 to thereby adjust the pressure with which the bushing 162 bears against the lever 149 independently of the clamping force of the head 171 of a machine screw 172 will exert against the bushing 162 when the screw 172 is threaded into the bushing 162, as shown in Fig. 13. By the provision of this resilient clamping means, the clamping effect of the assembly 156 may be closely regulated to normally hold, but not positively lock, the lever 149 when improperly positioned for too high acceleration and thereby limiting the excursion through which the article-supporting table framework 108 will be moved.

Cooperating with the web 151 is a lever 177 (Figs. 2 and 6), which is provided with an aperture 178, through which the machine screw 172 may be passed to thread it into a threaded aperture 179 in a bushing 180, which is, in turn, threaded in the web 151 and locked therein by means of a set screw 181. The arrangement and construction of the just-described mechanism is duplicated on the opposite side of the machine and is most clearly illustrated in Fig. 15, wherein the machine screw 172 is shown threaded into the bushing 180. The lever 177 is pivoted on the pivot pin 150 and has its right end, as illustrated most clearly in Figs. 1 and 2, pivotally connected to a cam-actuated bar 182 by means of a pivot pin 183. The end of the cam-actuated bar 182 opposite to the one in which the pin 183 is mounted is interconnected with a lever 184, similar to lever 177, by means of a pivot pin 185 and the lever 184 may be rocked about a pivot pin 186 when reciprocation is imparted to the bar 182. The lever 184 has a machine screw 172 mounted in an aperture therein and extending into a bushing 180 mounted in a web 151 in the same manner as described in connection with the web 151 fixed to levers 149 and 148. The levers which correspond to levers 148 and 149 are designated 188 and 189 (Fig. 5). The levers 188 and 189 have trunnion pins 190 and 191, respectively, mounted in them for operating a bearing ring 192 which surrounds and serves to actuate the threaded member 137.

Intermediate its ends, the cam-actuated bar 182 carries a cam roller 193 in a cam groove 194 (Fig. 12), the configuration of which is shown most clearly in Fig. 1. The bar 182 is provided with a clearance slot 195, through which a stud shaft 196 extends upwardly to support a cam 197. The cam groove 194 is formed in a cam plate 198 rotatable with a shaft 199 and the cam plate 198 has the stud shaft 196 fixed to it in axial alignment with the shaft 199. The shaft 199 has a drive plate 200 fixed to it for supporting and driving the cam plate 198. The cam plate 198 has a block 201 fixed to it, in which there is positioned a spring 202 for pressing a ball 203 into a groove 204 in the drive plate 200, thereby to normally interconnect the drive plate 200 and cam plate 198 in such a manner that when an undue amount of resistance is offered to the cam plate 198, the pawl 203 will be cammed out of the groove 204, thereby to permit relative rotation between the drive plate 200 and cam plate 198. The shaft 199 extends upwardly from a speed reducer 205 (Fig. 2) of any suitable construction, which is adapted to transmit power from its input shaft 206 to the shaft 199 and the shaft 206 is driven by a pulley 207, in turn driven by a belt 208. The belt 208 is driven by a pulley 209 mounted on a motor shaft 210 of a motor 211 mounted upon the main base member 20. The motor 211 is a reversible motor which operates under control of a pair of switches 212 and 213, which are, in turn, controlled by a pair of roller type actuators 214 and 215. The roller type actuators 214 and 215 are adapted to be actuated by a pair of cam members 216 and 217 fixed to shiftable rings 218 and 219 (Fig. 4), which may be shifted circumferentially with respect to the cam plate 198 and may be locked in place by means of set screws 220 and 221, respectively, (Fig. 12). The cams 216 and 217 carry pointers 222 and 223, which cooperate with a scale or other indicia scribed on the upper surface of cam plate 198 to indicate the limits of the excursion of the table as controlled by the position of the cam members 216 and 217 with respect to the cam plate.

Suitably mounted adjacent the cam 197, for example, by supporting it on a cross frame 231 (Fig. 3), is a bracket 232, which serves to support a potentiometer, designated generally by the numeral 233. The potentiometer 233 is provided with a winding 234 suitably positioned between the bracket 232 and a bracket member 235. The bracket member 235 is interconnected with the bracket 232 by means of a support angle member 236 and a guide member 237. The guide member 237 serves to guide a slide 238, which is shown most clearly in Fig. 12, and which is provided with an aperture 239 surrounding the guide member 237. The slide 238 carries a cam roller 240, which is urged to engage the surface of the cam 197 by a contractile spring 241, which is, in turn, attached to the slide 238 and to a post 242. The post 242 extends upwardly from a support bracket 243 supporting the switches 212 and 213. In addition to carrying the cam roller 240, the slide member 238 carries a contactor 244, which engages the winding 234 of the potentiometer 233. The winding 234 of the potentiometer is connected in circuit with the main drive motor 21 and controls the speed of this motor, thereby to regulate the speed at which vibrations are imparted to the table framework 108. Since the cam 197 and the cam plate 198 are driven together, the speed of the motor 21 will always bear a fixed relation to the position of the cam-actuated bar 182 and whichever one of the levers 149 or 189 has been connected to its associated web 151 by means of the machine screw 172, will thus be moved back and forth to change the relationship between the main drive shaft 30 and the table framework 108, thereby to maintain the rate of vibrations and the excursion of vibrations in a predetermined proportion.

In the operation of the apparatus, the apparatus may be set to impart either vertical or horizontal vibrations to the table framework 108 by selectively connecting either the lever 189 or the lever 149 to its associated web 151. While the use of the apparatus for imparting the rotary movement to the table framework 108 is not contemplated, it is possible that it might be desirable to so operate the table and, if so, the apparatus comprising the preferred embodiment of the invention is adapted to such use by connecting both the lever 189 and the lever 149 to its associated web 151 at the same time.

The apparatus may be operated to impart vibrations at a fixed rate of speed and through a fixed excursion by setting the levers 149 and 189 at the desired position with respect to the scale plate 153 and then initiating operation of the motor 21 without, however, operating the motor 211. When the lever 149 or lever 189 is locked in position by means of the machine screw 172, it will hold the associated eccentric portion of the shaft 30 and its bushing in a predetermined relation, thus to control the excursion of the vibrations imparted to the table by the combined eccentricity of the portion of the shaft and the bushing with respect to the bearing rings, which they operate.

A typical operative arrangement of the apparatus will now be described as illustrative of one mode of operation of the apparatus. If it be assumed that it is desired to impart horizontal vibrations to a piece of apparatus mounted on the table top 109 and suitably fixed thereto, and if it be assumed that the apparatus to be tested is to be subjected to vibrations at a gradual decreasing rate from 60 cycles to 30 cycles per second and through an increasing excursion distance of .054" to .217", the screw 172 may be removed from the web 151 associated with the lever 189 and transferred to the position where it will tend to lock the lever 189 against its associated scale plate in the manner illustrated in Fig. 15 and with the lever 189 positioned in the opposite position to that shown in Fig. 6 (i. e. rocked to its extreme counter-clockwise position about the pivot pin 186), at which point the threaded member 137 will have, through cooperation with the threads 135, rotated the eccentric portion 48 and the bushing 38 to the point where they provide a concentric bearing for the bearing 57. With this arrangement, rotation of the shaft 30 will impart no movement to the actuator members 55 and 56; consequently, the table top 109 will not be vibrated vertically. In addition to making the previously described arrangement, the screw 172, which had been holding lever 149 in its extreme counter-clockwise position, may be passed through aperture 178 and threaded into web 151 to fix levers 149 and 177 together as a single lever. The apparatus is now in condition to impart horizontal vibrations to the table top 109 and if the motor 21 and motor 211 are started, the cam members 216 and 217, having been set with respect to the cam plate 198 at the proper positions circumferentially of the cam plate to, through switches 212 and 213, effect the reversal of operation of motor 211 when the speed of vibration and rate of excursion, as mentioned hereinbefore, has reached its upper and lower limits, respectively, the apparatus is ready for operation. As the motor 21 drives the shaft 30, the motor 211 will be driving the cam 197 and cam plate 198 back and forth through a rotary path such that the speed of the motor 21 will be held proportional to the degree of eccentricity of the eccentric portion 41 and bushing 39 with respect to bearing 56 and the maximum acceleration of the table top 109 will be maintained constant since the excursion of the table top and its speed are varied in accordance with a definite mathematical law determining the shape of the cams 197 and 198.

In the event that, through inadvertence, the lever 189, before starting, has been left in the position shown in Fig. 6 and clamped in that position by means of the machine screw 172, the machine screw, through the clamping assembly 156, will not rigidly fix the lever 189 in this position and, as the motor 221 is speeded up under the control of the potentiometer 233, the excursion of the table top 109 in a vertical path will be reduced due to the engagement of the bushing 180 by the end of the lever 184, which will overcome the resilient action of the clamping assembly 156 and push lever 189 to its extreme counter-clockwise position, where it will be held by the clamping assembly 156 during further cycles of vibrations of the apparatus. In this manner, it would be impossible to so operate the machine as to impart vibrations to the table top 109 over the longer excursion and at the higher rate of speed.

When the rate of vibrations reaches its limit, as selected by the positioning of the cam members 216 and 217, the motor 211 will be reversed and cycles of vibrations will be imparted to the apparatus, being tested repeatedly while maintaining the rate of acceleration of the apparatus constant throughout the entire range of excursion and speed.

The other embodiment of the invention as illustrated in Figs. 16 and 17 includes the motor 21, plate-driving pulley 22, driven pulley 23, belt 24 and control motor 211 and is basically the same as the apparatus disclosed in detail in the preceding figures with the exception that the cam 198, driven by the control motor 211, is supplanted by a cam 250, which is shaped oppositely to the cam 198 and is provided with a cam groove 251, in which a cam roller 252 is positioned. The cam roller 252 is mounted on the lower end of a lever 253, which is, in turn, pivoted on a pivot pin 254 mounted on a bracket 255. The bracket 255 is mounted on the cross frame 231 and the pivot pin 254, extending upwardly therefrom, supports not only the lever 253, but a T-shaped lever designated generally by the numeral 256. The lever 256 is provided with arms 257, 258 and 259, the arm 258 being formed similarly to the levers 149 and 189 in that it carries a pointer 260 and may be clamped to a bracket 261 mounted on a cross member 231 and provided with a slot 262, through which a clamping assembly may extend to clamp the lever 256 in one of its adjusted positions. The arm 257 of lever 256 extends in the path of an upwardly extending projection 263 on the lever 253 and is adapted to receive a clamping assembly 156 when it is desired to fix the levers 253 and 256 together.

The arm 259 of lever 256, as shown most clearly in Fig. 17, is forked to extend around a ring 274, which encircles and is freely rotatable with respect to a control screw 275. The forked portions of the lever 259 are connected to the ring 274 by trunnion screws 276, which are threaded into the ring 274 and are freely rotatable in bearing blocks 277, which are slidable in slots 278 formed in the forked ends of the arm 259.

It is believed to be apparent, from the foregoing, that the rocking of the lever 256 about the pivot pin 254 will result in the screw 275 being moved longitudinally of a shaft designated generally by the numeral 279. The control screw 275 threadedly engages a threaded portion 280 of the shaft 279 and has a series of slots 281 extending through it for receiving portions of a slotted tube 282 provided with slots 283 in such a manner that while the control screw 275 may be moved longitudinally of the sleeve or slotted tube 282, the control screw and tube 282 are locked against rotation relative one to the other.

The shaft 279 is mounted in bearing blocks 290 and 291 suitably secured to the side frame members 28 and 29 and is provided with bearings 292 and 293, which serve to mount the shaft 279 for free rotation with respect to the side frame members. The bearing block 291 has a pair of thrust bearings 294 held in it by means of a cap 295, which serves to position the shaft 279 with respect to the side frame members 28 and 29.

In addition to the threaded portion 280, the shaft 279 has eccentric portions 296 and 297 formed on it, which are eccentric with respect to the axis of the shaft and correspond to the eccentric portions 40 and 41 on the shaft 30 described in detail in the other embodiments of the invention. Cooperating with the eccentric portions 296 and 297 are eccentric bushings 298 and 299, which are, in turn, surrounded by bearing rings 300, 301 and 302, which correspond to the bearing rings 57, 48 and 56, respectively, of the previously described embodiment of the invention and which serve to transmit movement of the shaft 279 to the table top 109.

In the present embodiment of the invention, the single-threaded portion 280 of the shaft 279 is adapted to cooperate with the control screw 275 to adjust the degree of eccentricity of both eccentric portions 296 and 297 of the shaft and their associated bushings 298 and 299 with respect to the bearing rings 300, 301 and 302, which will transmit either vertical or horizontal vibrations to the table top 109. Accordingly, the control screw 275 is operable to rotate the shaft 279 with respect to either the bushing 298 or the bushing 299.

The slotted tube 282 has a shoulder 303 formed on its left end (Fig. 17) in which there is formed an annular groove 304 adapted to receive a ring 305, which is freely rotatable with respect to the tube 282. The ring 305 extends between the forked end of a lever 306, which is pivoted on a pin 307, and may be manipulated to shift the slotted tube 282 to either of two positions.

Extending from the shoulder 303 is an annular clutch portion 308, which, in the position shown in Fig. 17, is in engagement with clutch teeth formed on the periphery of an inner member 309 of an "Oldham" coupling 310, which is connected to the bushing 298. Thus, as shown in Fig. 17, the slotted tube 282 is connected through the coupling 310 to the bushing 298 and when the control screw 275 is moved longitudinally of the shaft 279, the shaft 279 and bushing 298 will be rotated with respect to each other. Positioned in encircling relation with respect to a reduced portion 311 of the shaft 279 is a clutch member 312, which is keyed to the shaft 279 by means of a key 313 extending into a slot 314. The clutch member 312 is held against movement to the left or right (Fig. 17) with respect to the slotted tube 282 by a ring 315 threaded into the shoulder 303. Thus, the clutch member 312 may rotate with respect to the slotted tube 282, but is keyed to the shaft 279 and is slidable with respect to the shaft 279 when the tube 282 is moved to either the right or left. The clutch member 312 has projecting teeth 316, which, as shown in Fig. 17, are out of engagement with cooperating teeth 317 on the inner member 309 of the "Oldham" coupling 310, but which will engage with the teeth 317 when the slotted tube 282 is shifted to the left (Fig. 17) to thus lock the tube 282 to the bushing 298 unless the bushing 298 is to be rotated with respect to the shaft 279.

A similar arrangement to that just described is provided at the right end of the slotted tube 282 whereby, when the tube 282 is in the position shown in Fig. 17, the tube 282 will be locked to the bushing 299. When the tube 282 is locked to the bushing 298, the control screw 275 will serve to rotate the bushing 299 with respect to the shaft 279. This mechanism comprises a collar 320 fixed to the right end of the tube 282 by means of machine screws 321 and having freely rotatable with respect to it a clutch ring 322 slidably keyed to the shaft 279 by means of a key 323. The clutch ring 322 is prevented from moving to the right or left (Fig. 17) with respect to the collar 320 by a retainer ring 324. The clutch member 322, as shown in Fig. 17, has its teeth 325 in engagement with teeth on the inner member of an "Oldham" coupling 326 connected to the bushing 299 and thus, as shown, the bushing 299 and tube 282 are locked together. The arrangement of teeth on the inner member of the "Oldham" coupling 326 and on the clutch member 322 is such that these members can only be meshed when the eccentric portion 297 and bushing 299 are set for zero eccentricity in the manner described in connection with the first-described embodiment of the invention. Similarly, the arrangement of teeth on the inner member 309 of the "Oldham" coupling 310 and on the clutch member 312 is also such that they cannot be meshed unless the eccentric portion 296 and bushing 298 are arranged to have no eccentricity with respect to the axis of the shaft 299.

From the foregoing, it is believed to be apparent that by manipulating the lever 306 and locking it in either of its two adjusted positions by means of a machine screw 330, the apparatus may be set to vibrate the table top 109 either vertically or horizontally and, when so shifted, the cam plate 250 and cam member 197 may be set to automatically vary the excursion and rate of excursion of the table 109 throughout a selected range, as determined by the positioning of the cam members 216 and 217 in this embodiment of the invention, as well as in the first-described embodiment thereof, it being understood that in this apparatus, as in the previously described apparatus, the configuration of the levers 256 and 253 is such that any inadvertent setting of the arm 258, which would tend to vibrate the table top 109 at a rate in excess of a predetermined acceleration is automatically corrected. This result is effected by the upwardly extending projection 263 of lever 253 rocking the T-shaped lever 256 clockwise, whether the arm 257 has been attached to the lever 253 or not, if the motor 211 shifts cam 197 to a position where the potentiometer 233 will supply current to the motor 21 to drive the motor 21 at a speed faster than the selected maximum speed for a given excursion.

What is claimed is:

1. In a vibrating apparatus, a vibratory means for supporting articles to be vibrated, means for vibrating said vibratory means in a predetermined path including means for varying the excursions of vibrations imparted to the vibratory means, means for driving the vibrating means, means driven in synchronism with the means for varying the excursion for varying the speed of the driving means in accordance with the varying excursions of the vibrations to maintain the peak of acceleration of the vibratory means constant, reversible drive means for said synchronously driven means, and means settable to automatically reverse said drive means.

2. In a vibrating apparatus, vibratory means for supporting articles to be vibrated, means supporting said vibratory means for vibrating in a plurality of paths means for vibrating said vibratory means in a selected path including means for varying the excursions of vibrations imparted to the vibratory means, means for selecting the path of vibration of the vibratory means, means for driving the vibrating means, and means for varying the speed of the driving means in accordance with the varying excursions of the vibrations including a driven shaft, a cam on said shaft for controlling operation of the excursion varying means, and a second cam on said shaft for controlling operation of the driving means.

3. In a vibrating apparatus, a vibratory means for supporting articles to be vibrated, means for vibrating said vibratory means in either of two selected paths, means for varying the excursions of vibrations imparted to the vibratory means, means for maintaining the peak acceleration of the vibratory means constant as the excursions thereof are varied, and means connectible to render the means for vibrating the vibratory means in either one or the other path operative.

4. In a vibrating apparatus, a main drive shaft having portions formed eccentric of the axis thereof, bushings having eccentric inner and outer surfaces surrounding each of said eccentric portions, a bearing ring surrounding each of said bushings, a vibratory means for supporting articles to be vibrated in either of two paths, means connected to each of said rings and vibratory means for vibrating the vibratory means, means operable to vary the relative rotary position of an eccentric portion and its associated bushing between selected limits, and means selectively operable to render said last-mentioned means operable.

5. In a vibrating apparatus, a main drive shaft having portions formed eccentric of the axis thereof, bushings having eccentric inner and outer surfaces surrounding each of said eccentric portions, a bearing ring surrounding each of said bushings, a vibratory means for supporting articles to be vibrated in either of two paths, means connected to each of said rings and vibratory means for vibrating the vibratory means, means operable to vary the relative rotary position of an eccentric portion and its associated bushing, means selectively operable to render said last-mentioned means operable, and means for driving said selectively operable means in a selected cycle to vary the amount of vibration of the vibratory means over a selected range.

6. In a vibrating apparatus, vibratory means for carrying articles to be vibrated, a main drive shaft, means driven by said shaft for vibrating the vibratory means in either of two paths, control means for varying the amount of vibration imparted by the vibrating means to the vibratory means, means settable to select the path of vibration of the vibratory means, and means operable in a selected cycle for automatically actuating said control means.

7. In a vibrating apparatus, a vibratory means for carrying articles to be vibrated, a main drive shaft, a pair of means driven by said shaft for vibrating the vibratory means in either of two paths, a single control means for varying the amount of vibration imparted to the vibratory means by the vibrating means, means settable to select one of said pairs of means for operation and for disabling the other of said means from operating thereby to select the path of vibration of the vibratory means, and means operable in a predetermined cycle for automatically operating the control means.

8. In a vibrating apparatus, vibratory means for carrying articles to be vibrated, a main drive shaft, a pair of compound eccentric means driven by said shaft comprising eccentric portions on said shaft and eccentric bushings surrounding said eccentric portions of the shaft for vibrating the vibratory means in two paths, control means for varying the relative rotative position of said eccentric portions and their associated bushings, and shiftable means for selectively connecting an eccentric bushing to said control means.

9. In a vibrating apparatus, vibratory means for carrying articles to be vibrated, a main drive shaft, a pair of compound eccentric means driven by said shaft comprising eccentric portions on said shaft and eccentric bushings surrounding said eccentric portions of the shaft for vibrating the vibratory means in two paths, control means for varying the relative rotative position of said eccentric portions and their associated bushings, and shiftable means for simultaneously connecting one eccentric bushing to the shaft for rotation therewith and for connecting the other bushing to the control means.

10. In a vibrating apparatus, a main drive shaft, means adapted to be vibrated when said shaft is rotated, means interconnecting said means adapted to be vibrated and the shaft for transmitting motion from the shaft to the means to be vibrated, means for varying the effectiveness of said last-mentioned means during rotation of the shaft, means for varying the speed of the shaft in a definite relation to the means for varying the effectiveness of the interconnecting means, and a common drive means for said two varying means including means for automatically reversing the direction of said drive means when it has driven the two varying means to a selected operative position.

11. In a controller for a vibrating apparatus, an eccentric bushing, a main drive shaft, a screw connection between the shaft and bushing for varying the rotative position of the bushing relative to the shaft, means for controlling the speed of the shaft, and means interconnected with said last-mentioned means for adjusting said connection in accordance with the speed of the shaft.

12. In a controller for a vibrating apparatus, an eccentric bushing, a main drive shaft, a screw connection between the shaft and bushing for varying the rotative position of the bushing relative to the shaft, means for controlling the speed of the shaft, means interconnected with said last-mentioned means for adjusting said connection in accordance with the speed of the shaft, means optionally settable to hold said connection in an adjusted position, and means operative upon the speed of the shaft exceeding a predetermined value for overcoming the action of said settable means.

13. In a controller for a vibrating apparatus, an eccentric bushing, a main drive shaft, a screw connection between the shaft and bushing for varying the rotative position of the bushing relative to the shaft, means for controlling the speed of the shaft, means interconnected with said last-mentioned means for adjusting said connection in accordance with the speed of the shaft, including means settable to tend to hold said connection in an adjusted position, and means operable by the speed controlling means for overcoming the tendency of the settable means to hold the connection when the speed of the shaft exceeds a value which accords with the set position of the settable means.

14. In a vibrating apparatus, vibratory means for supporting articles to be vibrated, means for vibrating said vibratory means in a predetermined path including means for varying the frequency of vibrations imparted by the vibrating means to said vibratory means, means for varying the excursions of the vibrations, a motor driving means common to the frequency and excursion varying means for actuating both of them to maintain a predetermined relation therebetween, and reversing mechanism operable under control of the driving means for reversing the direction of drive of the driving means.

15. In a vibrating apparatus, vibratory means to be vibrated, means for vibrating said vibratory means in a predetermined path including means for varying the frequency of vibrations, imparted by the vibrating means to the vibratory means, means interconnected with the frequency varying means for varying the excursion of the vibrations in accordance with the frequency of the vibrations, and a driving means settable for automatically actuating both the frequency varying means and the excursion varying means in accordance with a predetermined pattern.

16. In a vibrating apparatus, vibratory means supporting articles to be vibrated, means supporting said vibratory means for vibration in a plurality of paths, means for vibrating said vibratory means in any one of a plurality of paths including means for varying the excursions of vibrations imparted to the vibratory means, means for selecting the path of vibration of the vibratory means, means for driving the vibrating means, and means interconnected with the excursion varying means for varying the speed of the driving means in accordance with the varying excursions of the vibrations.

17. In a vibrating apparatus, a table, a plurality of levers for supporting said table, eccentrics for actuating the levers to impart vibrations to the table, means for varying the effective eccentricities of said eccentrics, a drive shaft common to said eccentrics, means interconnected with the means for varying the effective eccentricity of the eccentrics for varying the speed of the drive shaft, and means optionally settable to render one of the sets of eccentrics ineffective.

18. In a vibrating apparatus, a main drive shaft having an eccentric portion, an eccentric bushing surrounding said eccentric portion, and means for varying the relative eccentricity of the bushing with respect to the axis of the shaft comprising a broken lever arrangement settable to vary the relative eccentricity of said bushing with respect to the axis of said shaft, said broken lever arrangement comprising a pair of levers having a common pivot and means for interconnecting them whereby the two levers act as a single lever when they are interconnected and whereby movement of one of the levers will not affect the other lever when they are disconnected, and a cam means for driving a portion of said broken lever arrangement.

19. A vibratory apparatus comprising a vibratory table, a shaft substantially midway between the ends and underneath said table, a pair of arms, a pivotal support for each of said arms, eccentric means on said shaft for oscillating said arms, a link connected to each arm between said pivotal support and said eccentric means for vibrating said table, a pivotally mounted bell crank lever attached to said table for vibrating said table in another direction, a second eccentric means on said shaft connected to the opposite end of said bell crank lever, and means for rotating said shaft to vibrate said table.

20. A vibratory apparatus comprising a vibratory table, a shaft substantially midway between the ends and underneath said table, a pair of arms, a pivotal support for each of said arms, adjustable eccentric means on said shaft for oscillating said arms an amount dependent on the adjustment thereof, a link connected to each arm between said pivotal support and said eccentric means for vibrating said table, a pivotally mounted bell crank lever attached at one end to said table for vibrating said table in another direction, a second adjustable eccentric means on said shaft connected to the opposite end of said bell crank lever and operable to actuate said bell crank lever an amount dependent on the adjustment thereof, means for rotating said shaft to vibrate said table, and means connectible to render either of said eccentric means operative to vibrate the table by adjusting the eccentricity thereof with respect to the shaft.

21. A vibratory apparatus comprising a vibratory table, a shaft substantially midway between the ends and underneath said table, a pair of arms, a pivotal support for each of said arms, eccentric means on said shaft settable for oscillating said arms, a link connected to each arm between said pivotal support and said eccentric means for vibrating said table in one direction, a pivotally mounted bell crank lever having one end attached to said table for vibrating said table in another direction, a second eccentric means on said shaft connected to the opposite end of said bell crank lever and settable to rock said bell crank lever, means for rotating said shaft to vibrate said table, and means connectible to render both of said eccentric means operative simultaneously to move the table in a predetermined path by setting them to a position of eccentricity with respect to the shaft.

22. In a vibrating apparatus, a main drive shaft, means for driving said shaft, means for varying the speed of said driving means, vibratory means driven by said shaft, variable connections between the shaft and vibratory means, means for varying said connections in accordance with a predetermined pattern, and a common drive means for both of said varying means including a motor and a control for said motor.

23. In a vibrating apparatus, a main drive shaft, means for driving said shaft, means for varying the speed of said driving means, vibratory means driven by said shaft, variable connections between the shaft and vibratory means, means for varying said connections in accordance with a predetermined pattern, a constant speed common drive means for both of said varying means, and means for selecting the range in which both of said varying means operate.

24. In a vibrating apparatus, a main drive shaft, means for driving said shaft, means for varying the speed of said driving means in accordance with a predetermined pattern, vibratory means, a pair of eccentric surfaces on the drive shaft, eccentric bushings on said surfaces, means interconnecting said bushings and vibratory means, and means on said shaft intermediate said surfaces for varying the rotative position of the bushings relative to the shaft to vary the excursion of vibration of the vibratory means.

25. In a vibratory apparatus, a main drive shaft, means for driving said shaft, means for varying the speed of said driving means in accordance with a predetermined pattern, vibratory means, a pair of eccentric surfaces on the drive shaft, eccentric bushing means on said surfaces, means interconnecting said bushing means and vibratory means, and means on said shaft intermediate said surfaces for varying the rotative position of the bushing means relative to the shaft to vary the excursion of vibration of the vibratory means, said means for varying the rotative position of the bushing means including clutch means having two separate effective positions for connecting one of the eccentric bushing means to the means for varying the rotative position thereof in each effective position.

26. In a vibrating apparatus, a main drive shaft, means for driving said shaft, means for varying the speed of said driving means in accordance with a predetermined pattern, vibratory means, a pair of eccentric surfaces on the drive shaft, eccentric bushings on said surfaces, means interconnecting said bushings and vibratory means, and means on said shaft intermediate said surfaces for varying the rotative position of the bushings relative to the shaft to vary the excursion of vibration of the vibratory means, said means for varying the rotative position of the bushings including clutch means for selectively interconnecting the eccentric bushings to the means for varying the rotative position thereof.

27. In a vibrating apparatus, vibratory means, links for supporting said vibratory means, levers for supporting said links, variable eccentrics for actuating said levers, said eccentrics being adjustable to zero eccentricity, a second set of variable eccentrics, a bell crank lever driven by said second set of eccentrics, a link interconnecting said bell crank to the vibratory means, and means for adjusting said second set of variable eccentrics to zero eccentricity.

28. In a vibrating apparatus, a vibratory means, means for imparting horizontal vibrations to said vibratory means including a link connected to said vibratory means, a lever for driving said link, a variable eccentric for driving said lever, means for imparting vertical vibrations to said vibratory means including a link connected to said vibratory means, a lever connected to said link, variable eccentric means for actuating said last mentioned lever, a common drive means for the eccentric means which actuates the vibratory means horizontally and the eccentric means which actuates the vibratory means vertically, said link and lever for imparting horizontal vibrations to the vibratory means serving to guide the vibratory means during vertical vibrations, and said link for imparting vertical vibrations to the vibratory means serving to guide it during horizontal vibrations.

EINER W. LARSEN.

REFERENCES CITED

The following references are of record in the file of this patent:

UNITED STATES PATENTS

| Number | Name | Date |
|---|---|---|
| 1,407,161 | Klocke | Feb. 21, 1922 |
| 1,556,201 | Busemann | Oct. 6, 1925 |
| 1,701,956 | McDonald | Feb. 12, 1929 |
| 1,977,924 | Sunder | Oct. 23, 1934 |
| 2,301,967 | Nosker et al. | Nov. 17, 1942 |
| 2,306,110 | Pendleton | Dec. 22, 1942 |
| 2,348,189 | Buchanan et al. | May 9, 1944 |
| 2,348,958 | Celio | May 16, 1944 |